March 14, 1967 J. A. ANDERSON 3,308,874
END CONSTRUCTION FOR SHADE ROLLER
Filed Feb. 3, 1965 3 Sheets-Sheet 1

INVENTOR.
JAMES A. ANDERSON
BY
ATTORNEYS

March 14, 1967 J. A. ANDERSON 3,308,874
END CONSTRUCTION FOR SHADE ROLLER
Filed Feb. 3, 1965 3 Sheets-Sheet 2

INVENTOR.
JAMES A. ANDERSON
BY
ATTORNEYS

INVENTOR.
JAMES A. ANDERSON
BY
ATTORNEYS

United States Patent Office

3,308,874
Patented Mar. 14, 1967

3,308,874
END CONSTRUCTION FOR SHADE ROLLER
James A. Anderson, Muskegon, Mich., assignor to
Breneman, Inc., a corporation of Ohio
Filed Feb. 3, 1965, Ser. No. 430,127
14 Claims. (Cl. 160—326)

This invention relates to rollers for window shades and the like, and more particularly to a construction to be used at one end of such rollers which permits either measured incremental adjustment or random, continuous adjustment of the effective length of the roller.

Rollers for shades of this type are produced in several standard lengths. These lengths have in the past been chosen to fit those windows having the most frequently encountered widths. Unfortunately however, a great number of windows are not of the standard widths, and even particular windows which are nominally of a standard width very often actually have small variance from the ideal or true dimensions. Consequently, it is necessary to adjust the length of the roller upon which the shade is mounted to the actual true width of each particular window. This must be done reasonably accurately, or else the roller will not fit its supporting brackets, or the shade may appear to be displaced to one side or the other of the window.

The adjustment in the length of the roller of necessity cannot be done at the factory, and it must be done by either the dealer or the customer. The standard practice is to select the next larger standard size of shade and reduce both the shade and its roller in width to the dimension which is required. For this purpose the dealers are normally equipped with special machines which neatly trim the shade and the end of its roller. Due to variance and errors of both mechanical and human origin in measurement and in the trimming process, it all too frequently occurs that the trimmed rolled has been cut slightly short of the precise size necessary to fit the particular window. Since even a variance of as little as one-sixteenth inch is likely to prevent the succesful mounting of the shade, the foregoing errors are apt to be critical. It also frequently occurs that particular windows which appear under casual inspection to be nominally of a standard size, actually are between an eighth-inch and a half-inch too wide for a standard roller. In either of these cases, an adjustable roller will permit the consumer himself to slightly extend the total length of the roller to meet the exact circumstances which he encounters in mounting it for use.

The rollers here involved normally have a spring-biased winding motor at one end which serves to rewind or retract the shade after it has been extended, and a gudgeon pin at the other end, about which the roller rotates when mounted. Adjustment in the length of the roller normally cannot be made at its motor end, and hence they must be made at the end where the gudgeon pin is located.

In a conventional roller, the gudgeon pin must be removed from the roller before the latter can be trimmed or otherwise foreshortened. This cause many problems. After the roller has been trimmed, the gudgeon pin must be replaced, and it is essential that it be replaced perfectly concentrically in the end of the roller. Experience has shown that even with reasonably sophisticated equipment designed for this purpose, dealers do not succeed in properly centering the gudgeon pin in the roller. The average customer, lacking all such equipment, has much greater difficulty, and his results thus are almost uniformly unsatisfactory. The gudgeon pin becomes placed eccentrically, and this causes the roller to turn unevenly. This in turn produces many undesirable effects, such as improper and uneven winding of the shade, jerky and irregular operation, and excessive noise when the shade is being extended or retracted. It also frequently produces excessive wear of the shade itself, and the end result is thoroughly unsatisfactory installation.

This problem has been approched from a number of different aspects, and a number of different solutions have been advanced in an effort to resolve it. One of these is to provide a plug means which may be inserted in the end of the roller, and which may be removed to permit the roller to be trimmed to different lengths. Such plugs permit small adjustments in length by means of spaced tabs on the plug which may be bent outward to provide stops at various distances, so that the telescoping of the plug and the roller is limited at these distances. Thus, fixed increments of length adjustment are provided. Another purported solution to the problem is a structure which provides holes in both rollers and plug, into which some form of stop such as a sinuous wire may be inserted at various increments of telescopic adjustment. Another solution which has been utilized is to provide a spring-biased end plug which automatically adjusts to the spacing between the brackets which support the roller.

These many solutions have met with varying degrees of success. The spring-biased end plug has been found to greatly increase the wear on the gudgeon pin and also on the bearings on which the roller is mounted. This wear materially reduces the effective life of the roller. Any adjustment means which creates a projection or protuberance above the outer surface of the roller creates an undesirable condition which is telegraphed through the shade material. When a shade having this condition is extended, that portion of the shade close to the roller during the retracted position in which the shade is normally stored will be deformed from the projection, and will show unsightly imprints of the projection or other irregularity of the roller surface. The use of the spaced tabs previously noted has proven to be reasonably successful, but this requires the dealer or customer to bend out the tabs and perform other operations which may or may not be done with the degree of accuracy required to assure fully satisfactory operation of the shade after installation. Further, the tabs require the end plug to be fabricated of metal, whereas plastic materials are often more desirable, for several reasons. Also, after being bent several times the metal tabs tend to break off, thereby removing the adjustable feature of the plug.

Another limitation of previous adjustable shade rollers, regardless of their particular type, is the tendency of the plugs used in such rollers, during handling, shipment, and actual use, to gradually enter completely inside the tubular end of the roller itself. The terminal plugs are very difficult to remove from this position, since they are largely inaccessible and may become lodged within the tube. Frequently considerable time-consuming effort must be spent to remove the plugs so that the desired adjustment may be accomplished and the plug reinserted properly into the roller. It is bad enough when this effort must be made by dealer, but when an individual consumer is shipped such an article he is likely to feel that the entire structure is inferior, and that the manufacturer is not reputable as well.

A further aspect of the same problem occurs in the typical case where the tubular end of the roller is either metal or fiber and the terminal plug is made of wood. In such a case, although the plugs may be carefully made to closely fit within the tubular roller at the time when they are manufactured, when the rollers are shipped to a hot, dry climate the wood shrinks significantly. This results in the loosening of the plug to the point where it slips within the tubular portion of the roller. When this occurs, the roller structure becomes useless, since it will not remain suspended between the usual brackets.

The present invention provides a greatly improved solution to the problems discussed above, using a telescoping terminal apparatus or end plug means having improved and desirable characteristics. The use of the present terminal eliminates all necessity for removing the gudgeon pin when the roller is to be shortened. The gudgeon pin is mounted upon the plug during its manufacture, and consequently it is perfectly centered when the article is shipped and remains so throughout its life. The entire plug is removed during the trimming operation of the roller, and is restored in its normal position when the trimming has been completed. The plug is automatically self-centering, and consequently its gudgeon pin will automatically be centered within the roller when the terminal is replaced.

Additionally, the present terminal construction provides a means for increasing the friction of the engagement of terminal plug and roller in a manner substantially unaffected by particular environmental conditions so that the terminal will never slip into or out of the roller. This provides a terminal which may be adjusted continuously along its length, at any desired random position. The invention further includes structure for fixedly and absolutely retaining a predetermined degree of insertion of the terminal plug into roller, and this structure provides for extremely easy, foolproof, and completely accurate length adjustment, in series of positive steps. That is, the adjustment of the relative engagement of plug and roller tube may be accomplished by a succession of accurately determined fixed, incremental steps. Further, the present invention includes a positive stop by which the terminal plug is absolutely prevented from entering completely inside the tubular roller.

The foregoing purposes and advantages of this invention, together with others which are equally desirous and equally a part thereof, will be understood by those acquainted with the design and construction of shade rollers and shade roller equipment upon study of the following specification and its appended claims, particularly when taken in conjunction with the accompanying illustrative drawings setting forth preferred embodiments of the invention.

Briefly stated, the present invention provides an end construction for shade rollers which has a generally plug-shaped configuration and which may readily be manufactured with good economy from wood in a typical manner, or alternatively from sheet metal or the like, in tubular form. Each embodiment of the end construction includes a cap structure at one extremity of the basic plug. Each cap structure carries a gudgeon pin at its center. In one embodiment, the gudgeon pin is inserted into and through the cap during manufacture in a central position, and the cap structure is then installed upon the end construction itself. In other embodiments, the gudgeon pin is formed integrally with the cap structure, as by extrusion processes or by moulding such material as nylon or certain of the polyvinyls. The end construction further includes protrusions from the sides of the sheet metal plug embodiment or a floating pin mounted transversely through the diameter of the wooden plug, at its end opposite the cap and gudgeon pin structure. In the latter case, the ends of the floating pin are rounded and protrude somewhat beyond the side surfaces of the plug. Consequently, when any of the embodiments of the end construction are inserted into the tubular end of the shade roller, the protrusions at the sides of the plug bear firmly against opposite points on the walls of the roller tube so as to securely hold the end construction and roller in predetermined relative positions, and also to guard against inadvertent changes in these positions. Further, the diameter of the sheet metal end construction is made to have a variable diameter which tends to expand with an inherent resilient bias against the inner walls of the roller tube, thereby augmenting the frictional forces between the two elements. Each embodiment of the end construction includes stop means which extend outwardly from the end thereof carrying the gudgeon pin. These positively prevent the end plug from being forced completely within the roller tube. Further, a plurality of annular sleeve-type spacing means is provided for insertion over the cylindrical outside surface of the end plugs, to abut on one side against the stop means at the end of the plug, and on the other side against the end of the roller tube. In this manner the spacing sleeves effectively determine the total or overall length of the roller, by controlling the depth to which the end plug may be inserted into the tubular end of the roller. The spacing means may be added, removed, changed, and interchanged when desired to vary the length of the complete roller in accurate, predetermined incremental steps. Finally, an improved mounting apparatus is provided for the roller assembly, by which its end opposite the plug and gudgeon pin construction of this invention may be anchored to the usual exterior mounting bracket, thereby positively preventing longitudinal movement of the roller during its operation.

Figure 1:
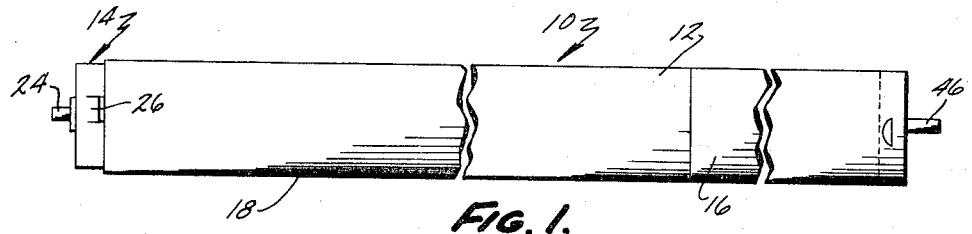
FIG. 1 is a broken side elevational view of a complete roller assembly including an end construction.

Referring now specifically to the drawings, the numeral 10 in FIG. 1 indicates a complete shade roller construction. This includes the basic roller 12, and an end construction 14 in accordance with the present invention. The roller 12 may be of any suitable construction, such as entirely tubular in nature or having a substantial portion 16 of it in the form of a solid rod of wood or other material, having a tubular extension 18 on the inwardly-directed end of the rod. Irrespective of the basic construction of the roller itself, its end nearest the end construction 14 must be tubular in nature, as illustrated at 18 in FIG. 1. This tubular portion is preferably made of a stiff fiber material.

Figure 2:
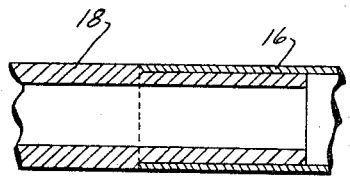
FIG. 2 is a fragmentary, central sectional view of a portion of a roller such as that of FIG. 1, showing details of its construction.
Figure 3:
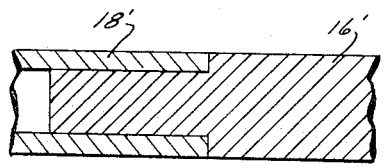
FIG. 3 is a fragmentary, central sectional view of another embodiment of a roller such as that of FIG. 1, showing further details of its construction.

The joint between this tubular portion of the roller and the remainder thereof should have a smooth and uninterrupted outward surface. If roller part 16 itself is tubular, such as a rolled sheet metal member, it should be joined to the fiber tube 18 as shown in FIG. 2. It is here seen that the fiber tube has a relieved annular portion at its end which slides inside metal tube 16 so that the outer surfaces of the two members are in alignment with each other at the joint between them. The two members are glued together in this position to assure a strong joint having the desired smooth outer surface. On the other hand, if a solid rod is preferred for roller part 16, such as the wooden rod shown at 16' in FIG. 3, then the latter should have the relieved annular portion at its end, with the fiber tube 18' passing over the relieved part of the wooden rod 16', in a manner which similarly provides the desired smoothly aligned outer surface.

Figure 4:
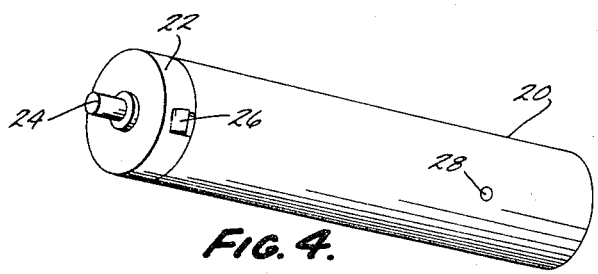
FIG. 4 is a perspective view showing a first embodiment of a complete end construction for shade roller.
Figure 5:
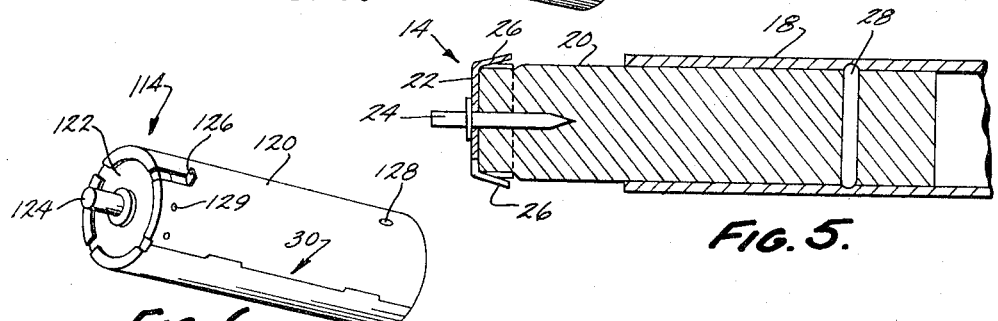
FIG. 5 is a fragmentary central sectional view of the end construction of FIG. 4 and also of an exemplary roller tube, showing the engagement of the two.

The open end of the fiber roller tube 18 receives the end plug construction 14 of the present invention. As seen in FIGS. 4 and 5, the end construction of this embodiment includes a cylindrical body portion 20 and a cap structure 22. The cap structure carries a gudgeon pin 24 at its center, which is inserted therethrough into the body 20 during the mounting of the cap structure upon the plug, performed at the place of manufacture. The cylindrical body 20 of end plug 14 has an exterior diameter such that it is received with a snug frictional engagement into the end of roller tube 18, as shown in FIG. 5. The cylindrical body 20 should be closely held by roller tube 18, but at the same time the interfitting of these two members must permit withdrawal of the plug 14 from the tube 18 without the use of excessive force.

The cap structure 22 includes an end portion and a tubular shoulder or apron portion, which fits over the end of the body 20 and around its surface periphery. A pair of wing-like stop means 26 are provided by shearing the wing or tang from the shoulder or apron of the cap itself, and then bending the wings to incline them outwardly away from the cap, in the general position shown by the drawings. As the phantom lines show, the angle at which the wings 26 incline from the shoulder of the cap should align the ends of the wings with the tubular end 18 of the roller. A primary purpose of wings 26 is to directly contact the end of roller tube 18 in the event that vibration, or rough treatment of the complete roller assembly in shipment, handling or in use tends to drive the body 20 of plug 14 completely into the tubular portion of the roller. Thus, the end construction 14 can never inadvertently enter completely into and possibly become lodged within the interior of tube 18.

It is to be noted that the body portion 20 of end plug construction 14 carries a floating pin 28, which is mounted transversely through the diameter of the body near the end thereof opposite cap structure 22. As clearly seen in FIG. 5, the ends of floating pin 28 are smoothly rounded, and they project beyond each side of the body 20 a brief distance. Consequently, when the body portion is inserted into the roller tube, the ends of the floating pin come into firm, frictional contact with the inner walls of the tube, and the floating pin becomes wedged therein with a moderate degree of firmness. In this manner the floating pin 28 augments the initial frictional engagement of the cylindrical body 20 and the tube, and if for any reason, such as superannuation or extreme warm and dry climate conditions, the body 20 shrinks to a degree where it might otherwise merely slip or slide within th tube, the floating pin will nonetheless maintain its own constant frictional engagement, since it is made preferably of metal and is unaffected by the stated adverse conditions.

Figure 14:
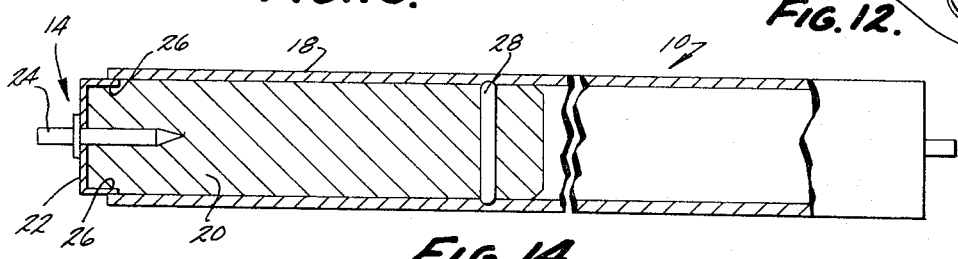
FIG. 14 is a side elevational view of a complete roller assembly including the end construction shown in FIGS. 4 and 5, in which further aspects of using the latter are shown.

As FIG. 14 illustrates, if it is purposely desired to insert end construction 14 within roller tube 18 further than the wings 26 of cap 22 would normally allow, wings 26 may with moderate effort be resiliently deformed back into alignment with the cylindrical shoulder of cap 22 from which they were formed. In this condition, the end construction 14 may be fully inserted into the tube, since wings 26 will now pass between the inside walls thereof. In this state the wings 26 exert an outwardly-directed force against the inner walls of the tube due to their inherent bias toward an inclined position. Thus, the wings further augment the frictional engagement of end plug and tube, while permitting the complete roller assembly 10 to be adjusted to a shorter length than is otherwise possible. If at any subsequent time the plug 14 is again withdrawn to a point where the ends of wings 26 clear the edge of the tubular roller, the wings will once again resiliently return to their normal inclined position, to operate as a positive stop in the manner stated previously.

Figure 6:
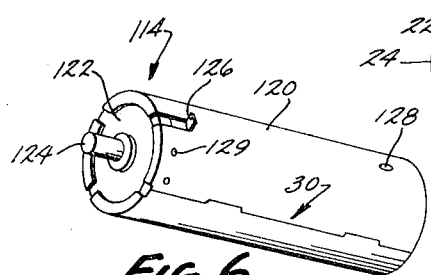
FIG. 6 is a perspective view of a second embodiment of an end construction provided by the present invention, having further desirable features.
Figure 7:
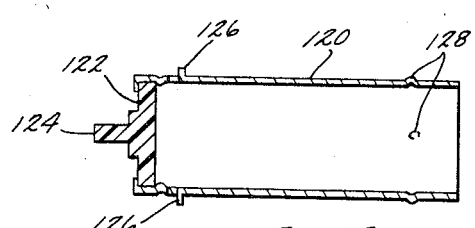
FIG. 7 is a central sectional view of the end construction of FIG. 6.

A second embodiment 114 of the basic end construction 14 previously described is shown in FIGS. 6 and 7. The end plug 114 similarly includes a generally cylindrical body portion 120, and a cap structure 122 with a gudgeon pin 124. In this case, however, the body portion 120 is formed from sheet metal which is rolled into the specified cylindrical form. Cap structure 122 is a generally disk-shaped member which as FIG. 7 shows, has a concentric gudgeon pin 124 formed integrally therewith. The entire cap 122 is preferably moulded from nylon or other suitable polymer, since such materials have excellent qualities including a very low wear factor plus smooth and practically silent operation.

The cap structure is affixed into place in this embodiment by crimping the end extremities of the body portion over the edges of the cap, as shown in FIG. 6. It is to be noted that the diameter of the cap is the same as the inner diameter of the tubular plug body 120, so that when it is affixed in place therein, the outer surface of the plug has a uniform diameter over its entire length. Further, the body 120 has a number of dimples 129 formed in its surface. These are small protrusions directed into the interior of the tubular plug immediately behind the cap. They are placed there when the plug is first formed, and act as stops for the cap structure, to index it in the desired position within the tubular plug body. End construction 114 preferably has outwardly-directed protrusions 128 upon its body portion 120, but instead of being a transverse member, these may merely be rounded deformations of the body portion itself. End construction 114 further includes stop means 126, which preferably are ears or tangs sheared from the sheet of body material when first rolled and cut, and then bent outwardly away from the outer surface of the body and approximately normal thereto.

It will be seen that when end plug 114 is inserted into roller tube 18, that the protrusions 128, which preferably are formed approximately ninety degrees apart around the circumference of the body portion 120 thereof, will come into contact with the inner walls of the tube 18 with a frictional engagement therebetween. Also, ears 126 will come into contact with the end of the tube to prevent the inadvertent complete entry of the plug thereinto, with all of the attendant difficulties thereof, in a manner analogous to that of wings 26, discussed previously.

Figure 10:
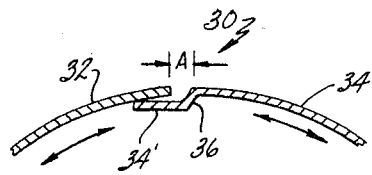
FIG. 10 is a sectional view taken through the plane X—X of FIG. 9.
Figure 11:
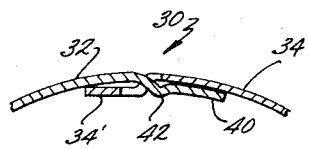
FIG. 11 is a sectional view taken along the plane XI—XI of FIG. 9.
Figure 8:
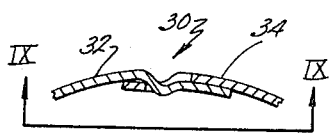
FIG. 8 is a fragmentary end view of the end construction of FIG. 6, showing a portion of its periphery.
Figure 9:
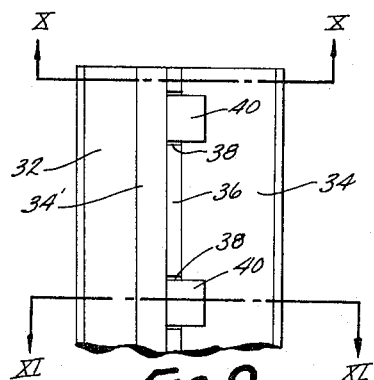
FIG. 9 is a fragmentary view taken along the plane IX—IX of FIG. 8, showing details of the interior of the structure there illustrated.

It should especially be noted that the body portion 120 of end construction 114 has a longitudinal lap joint across its surface periphery which is preferably formed when the sheet material of the body is first rolled and cut. This lap joint is indicated at 30 in FIG. 6, where it will be seen that the joint is the juncture of the two ends of the sheet of material from which the body portion 120 is preferably formed. The two ends of the sheet metal forming the body are more clearly seen in FIG. 8, wherein they are designated 32 and 34, respectively. As here illustrated, it is apparent that the ends 32 and 34 overlap each other, and the manner in which they overlap is shown in more detail in FIGS. 9 thru 11.

Referring to the latter figure, the end 34 of the sheet material is seen to be crimped longitudinally so as to have a radially offset portion 36, by which its extremity 34' is made to lie approximately parallel with portion 34, but in a position underneath the other end 32 of the cylindrically-formed sheet of material. In this position, end 32 is aligned to abut the offset 36 if the cylindrical plug should be squeezed to increase the amount by which the two ends 32 and 34 overlap each other (see FIG. 10). Furthermore, end 32 has circumferentially extending tongues or fingers 40 formed thereon which extend beyond the edge which abuts offset 36, and these fingers pass through apertures 38 formed in the offset itself (see FIGS. 9 and 11).

Each of the fingers 40 preferably has a ridge-like projection 42 formed therein (FIG. 11) which will abut against an edge of the apertures 38 in the offset when the finger 40 is withdrawn therethrough a predetermined distance. This acts to limit the maximum possible amount of such withdrawal. Further, the abutment of the extremity of end 32 against the offset 36 acts as a positive limit of the maximum amount that the fingers 40 may be advanced through the aperture 38. Thus, the overlap at joint 30 provides a means by which the diameter of the tubular cylindrical body portion 120 of end construction 114 may be varied between positive limits. Accordingly, the end construction of this embodiment is made to have a normal diameter that is larger than the inner diameter of the roller tube into which it is to be inserted. In order to insert it, the body portion 120 is squeezed so that the overlap at 30 increases as the walls of the body are resiliently deformed. In this condition the end plug should be freely insertable within the roller tube, and when released therein it will resiliently expand toward its normal larger diameter and bear against the inside of the tube. In this manner, changes in the sizes of various tubes may be readily accommodated, and the end plugs will be securely retained within the tubes.

Figure 13:
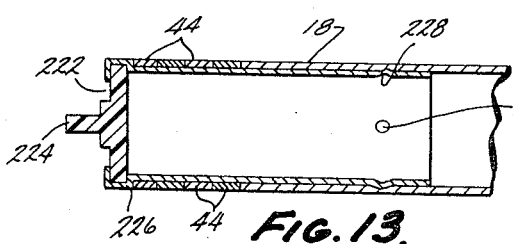
FIG. 13 is a central section of the end construction of FIG. 12, and also of an exemplary roller tube, showing the engagement of the two.
Figure 12:
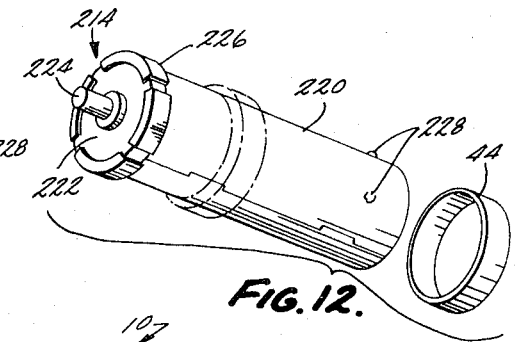
FIG. 12 is a perspective view of a third embodiment of an end construction for rollers, including an adjustment structure and showing in phantom the manner of engaging the two.

In FIGS. 12 and 13, another embodiment of the end plug construction of the present invention is shown at 214. As will be perceived, plug 214 is somewhat similar to plug 114, described immediately above. However, the disk-shaped portion of cap structure 222 of this embodiment has a larger diameter than that of body portion 220 to which it is joined. The cap structure is held in place upon the end of the body by first deforming the end extremities of the body outwardly, away from its cylindrical surface, and then crimping the ends around the edges of the cap in the manner indicated. This produces an annular abutment or shoulder portion, designated 226 rather than the straight, continuous outer surface configuration of the previous construction. Plug 214 also preferably includes protrusions 228 formed in its body portion 220. Further, cap structure 222 includes an integral, concentric gudgeon pin 224 which, like its counterpart 124 described above, is preferably moulded with the disk-like portion of the cap from nylon or other like polymer.

Figure 16:
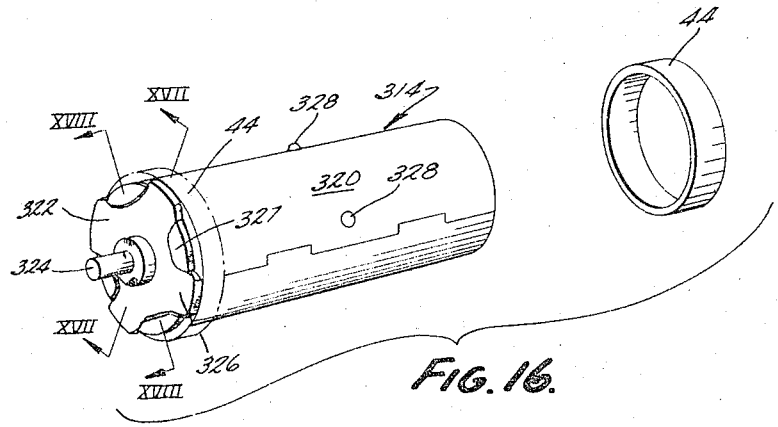
FIG. 16 is a perspective view of a fourth embodiment of an end construction for shade rollers, including the length adjustment structure shown in FIG. 12, showing in phantom the manner of engaging the two.
Figure 17:
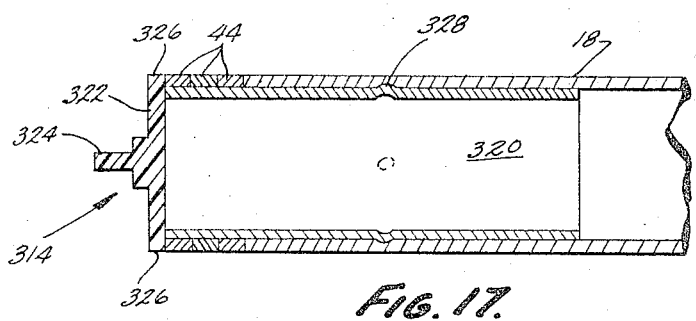
FIG. 17 is a central sectional view of the end construction of FIG. 16, taken through the plane XVII—XVII thereof, including also an exemplary roller tube engaged therewith.
Figure 18:
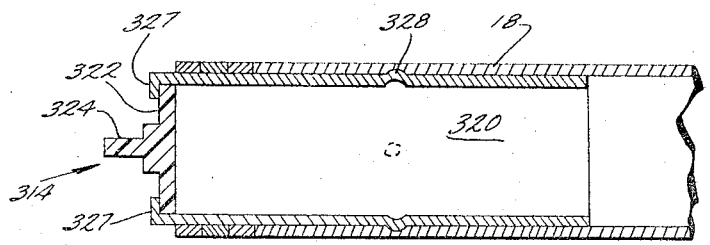
FIG. 18 is a central section of the end construction of FIG. 17 after a ninety-degree rotation thereof, taken through the plane XVIII—XVIII thereof.

In FIGS. 16, 17 and 18 a further embodiment of the end plug construction of this invention is illustrated, where it is designated 314. End plug construction 314 is somewhat similar to plugs 114 and 214 which have already been described, in that it includes a tubular body portion 320 and a cap structure 322 secured to one end thereof. The cap structure 322 includes a concentric gudgeon pin 324 which is preferably moulded integrally with the generally flat portion of the cap from a lubricous plastic such as nylon. The flat portion of the cap structure 322 includes four peripheral tangs or lugs 326 which are arranged in quadrature and extend beyond the cylindrical outer surface of the plug body 320 so that when the plug is inserted into the roller 18 the lugs 326 will be aligned with and coextensive with the outer surface of the roller. (FIG. 17.)

The cap structure 322 is retained in place upon the end of the plug body 320 by four extending ear portions 327 (FIGS. 16 and 18) which extend longitudinally from the tubular plug body. The ears 327 are, like the lugs 326, arranged in quadrature, and they are positioned approximately forty-five degrees from the lugs so that one ear extends between each pair of lugs. The ears are crimped downward into place around the end of the cap (FIG. 18) and securely hold the cap in place against the tubular body. In this position the lugs abut against the end portions of the cylindrical body between adjacent ears 327, and consequently the cap structure is positively prevented from motion in either direction relative to the body. It will be noted that the plug 314, like plugs 114 and 214, preferably includes protrusions 228 formed in the body portion which extend outwardly therefrom and engage the inside of tube 18 (FIGS. 17 and 18) to augment the frictional engagement between plug and roller.

In FIGS. 12 and 16 an annular, sleeve-like spacing means 44 is illustrated, and as is there indicated, this sleeve has an inner diameter slightly larger than the outer diameter of the body portion 220 or 320. The sleeve telescopes over the particular body portion being used, in the manner indicated in the two figures. As FIGS. 13 and 17 show, a plurality of the spacing sleeves 44 are inserted over the plug body to abut against the end of roller tube 18 and against the shoulder 226 behind cap structure 222 of plug 214, or against the lugs 326 of plug 314. In this manner the sleeves in effect determine the length of the complete roller assembly by spacing the end plug construction which has been selected for use at different desired positions relative to the tubular roller end.

The sleeves 44 are preferably accurately formed in a predetermined narrow uniform width, so that a series of uniform incremental adjustments are readily available to any consumer, without requiring any particular tools or equipment, or even any skill. All he must do is remove the end plug and add or subtract spacing sleeves until the desired overall length is achieved. The spacing sleeves are preferably so economical that they may be discarded when not needed, and one desirable form of construction realizing this economy is fiber tubing similar to that used for the roller portion 18. This material is strong and durable, yet is relatively inexpensive, and it is easily cut into the desired narrow sleeves. Moreover, this tubing may be obtained with an outside diameter corresponding to that of the roller tubing and the shoulder portion 226 of plug 214 (FIG. 13) or the lugs 326 of plug 314 (FIG. 17), so that the entire surface of the assembled roller has the same continuous periphery desired, with no projections or irregularities. It should be clear that the feature of the spacing sleeves is not necessarily limited to the embodiment shown in FIGS. 12 and 13 and 16–18, but may be used satisfactorily with the other embodiments previously shown and described.

It has been observed by the present inventor that in the optimum roller configuration, where the end construction 14 and its various embodiments are substantially less than a minor portion of the overall length of the basic roller 12, including its tubular extremity 18, (as for example having a length of only a few inches in the case of a typical 36-inch shade and roller) that a most unusual result occurs.

When such a roller is mounted in the usual brackets at its end extremities and is repeatedly operated by extending and retracting a shade mounted thereupon, the tendency of the end plug construction is to creep outward from the roller, in tiny increments of movement over long periods of usage. Thus, even though the initial adjustment of the roller construction of the present invention should inadvertently be a trifle shorter than the exact distance between the mounting brackets, in time the roller will actually adjust itself to the exact mounting distance. When it reaches this extremity it proceeds no further, of course, and merely bears against the mounting brackets with a light pressure.

The foregoing is to be contrasted with the case of an elongated end plug of perhaps one-fourth to one-half of the total length of the roller assembly. In this case, continued operation of the shade assembly will result in the end plug creeping inward into the interior of the roller tube. Only a small amount of this travel or creep can occur before the gudgeon pin is withdrawn from its mount, at which time the entire shade slips and falls.

The spacing sleeve means for the end construction herein shown, and the structure provided by the present invention for exerting increased frictional forces between the tubular roller and the body of the end plug effectively precludes inward creeping of even the longer type of end constructions, so that there is practically no possibility of their rollers coming loose from the mounting brackets. However, in order to utilize the preferred shorter version of the present end constructions to their best advantage, it is desirable to secure the motor end of the roller assembly securely to its mounting bracket, and in an interlocking manner so that it must remain properly in position regardless of whether the end plug itself creeps outward or not. If the end plug does creep in this manner, it will then actually extend the roller assembly to the precise distance between the mounts.

Figure 15:
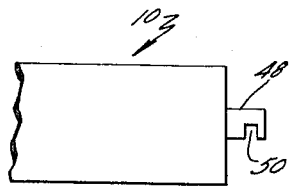
FIG. 15 is a fragmentary side elevational view of a preferred spear configuration for use at the end of a complete roller apparatus opposite that having an end construction such as is shown in the previous figures.

As previously stated, the typical roller construction has at its end opposite the gudgeon pin an automatic shade-retracting mechanism, which typically is a spring-wound motor unit. These motors are conventional, and consequently none is specifically shown in the figures. The retracting motor operates through a generally flat spear such as is shown in FIG. 1 at 46, which protrudes from the end of the roller and which is typically mounted in an external bracket having a vertical slot, so that the spear is held stationary and the spring motor may operate against it. Accordingly, in the most preferred version of the present invention I provide a spear construction having the form shown in FIG. 15, wherein the spear is designated 48. This preferred form incorporates a notch or detent 50 in one side of the spear. The spear itself is mated with the typical mounting bracket in the usual manner, except that in the present case it automatically interlocks into position by means of the notch 50, and thereby prevents any longitudinal movement of the basic roller portion 12 away from the mounting bracket at that end.

Having now fully and completely described in detail the structure of the most preferred and of other embodiments of this invention, its assembly and operation are likely to already be fully appreciated. Briefly, however, when a customer has ordered a particular width of window shade, the dealer chooses the nominal length of roller 10 which is closest to the desired width, and proceeds to adjust it accordingly. Adjustment is effected by varying the extent to which the end construction on this invention is inserted into the tubular end of the basic roller itself. If the next closest length of roller to the dimension which has been ordered is slightly larger, the dealer may remove the end plug construction completely from the roller and trim off a corresponding amount of both the shade and the fiber tube.

Whether such trimming is necessary or not, the desired length of roller is finally achieved by moving the end plug to the desired degree of insertion within the roller tube against the frictional forces of the plug and its outwardly-directed protrusions or transverse floating pin, and also against the forces exerted by the variable tubular diameter of the plug, if that embodiment is to be used. Additionally, some or all of the spacing sleeves which have been described are then either removed or added to the plug in order to properly space the terminal plug within the roller tube to the exact extent desired. This establishes the desired length of roller, and if minor adjustments subsequently become necessary, as in the case of a mistake in measuring or a change of windows, the consumer may easily reposition the end plug himself. Due to the stop means provided at the outermost end of the various plug constructions, the plugs cannot inadvertently become pushed completely within the roller tube, whether during shipment or otherwise, and thereby a major difficulty of such rollers is effectively eliminated.

It will be understood from the foregoing explanation that the end plug construction provided by the present invention makes possible a quick, simple, and easy method of adjusting the length of a shade roller. No special tools, equipment or skills are required to adjust the roller length to precisely the width of a particular window. The apparatus of this invention is extremely flexible in operation, and is very forgiving of errors in measurement and the like, since it permits both very small and rather appreciable adjustments to be made in the length of the roller at any time subsequent to its purchase or initial installation. Furthermore, the outer surface of the complete roller construction is smooth and continuous across its length, having no material projection which would damage the shade or mar its appearance.

After having considered the foregoing description of this invention and having observed the modifications shown, those having skill in the art to which it pertains may recognize that other modifications may be made which likewise embody the spirit of the invention and incorporate its concepts. All such modifications should be considered as included in the scope of the hereinafter appended claims, unless these claims by their language expressly state otherwise.

I claim:

1. An adjustable roller construction for window shades, comprising: a shade roller having a main body portion characterized by an open tubular gudgeon pin end and a motor end, said motor end having a flat spear for mounting the roller; a cylindrical plug body arranged to be insertable in said tubular end; a cap structure for the end of said plug body; said cap structure having an end portion and a tubular skirt having a diameter sufficient to telescope over said plug end; at least two oppositely disposed resiliently flexible wings cut from said cap structure skirt and extending outwardly at an angle from said cap and toward said main body; said angle of extension of said wings being such that the ends of said wings are within the circumferential silhouette of said main body; said wings abutting said tube end when said plug is inserted thereinto to prevent the plug from being forced completely inside the roller tube; said wings being resiliently deformable toward said body against their inherent outward bias to pass into said roller tube, to there bear outwardly against the inner walls of the tube and augment the frictional engagement of tube and body.

2. An end plug for a shade roller having a tubular end, comprising: a cylindrical tubular plug body; said tubular plug being of resilient wall material; said tubular plug wall having a lap joint extending longitudinally thereof, said lap joint having circumferentially slidable interlocking means permitting limited diametric adjustment; said plug normally having a diameter larger than the inside of the roller tube and being contractable at said lap joint to fit inside the tube and expand outwardly against it.

3. An end plug as described in claim 2 wherein said interlocking means comprises a pair of circumferentially extending tongues on one portion of said lap joint and a pair of openings in the other portion through which said tongues are slidably received; said other portion at said openings being offset radially inwardly; said tongues intermediate their ends being offset radially inwardly to form stops engaging said other portion for limiting diametric expansion of said plug.

4. An adjustable roller construction for window shades, comprising: a shade roller having a main body portion characterized by an open tubular gudgeon pin end; a cylindrical tubular plug body having an outside diameter enabling it to be insertable into and frictionally engage said roller tube; a moulded disk-like cap closing one end of said tubular plug; said cap having a diameter comparable to that of the outside of said roller and larger than that of said tubular plug; said plug having an outwardly extending shoulder against which said cap is seated, the sides of said plug being crimped around the edge of said cap with the ends thereof overlying a portion of the outer face thereof; said shoulder forming a stop means for preventing the plug from being forced completely inside the roller tube.

5. An adjustable roller as described in claim 4 wherein there is provided at least one annular spacing sleeve slidably mounted on said plug and having an outer diameter comparable to that of said tubular roller and said shoulder; said spacing sleeve spacing said shoulder from the end of said tube to determine the effective length of said roller construction.

6. A removable adjustable terminal plug for insertion in one end of a tubular shade roller, said terminal plug comprising: a tubular body; a cap having a gudgeon pin, said cap received in one end of said tubular plug; means engaging said cap and fixedly securing it to said tubular body; stop means projecting radially from said plug and forming a shoulder generally adjacent said cap for limiting insertion of said plug in the shade roller; a plurality of annular spacing sleeves slidably seated about said plug for engaging said stop means and the end of the roller for adjustably limiting the amount of insertion of said plug in the roller.

7. A terminal plug as described in claim 6 wherein said plug has a moulded terminal cap fixedly mounted in one end thereof.

8. A terminal plug as described in claim 7 wherein said cap has a diameter greater than said plug and the walls of said plug are offset radially outwardly to wrap around the circumferential periphery of said cap; said offset forming said shoulder stop means.

9. A terminal plug as described in claim 6 wherein said stop means are radially outwardly extending tabs struck from the side walls of said plug.

10. A removable, adjustable terminal structure for shade rollers of the type characterized by an open tubular gudgeon pin end, said terminal comprising: a cylindrical tubular plug body having an outside diameter enabling it to be inserted in said tubular end; a disk-like cap for one end of said tubular plug; said cap having a diameter comparable to that of said tubular plug; said cap secured to said plug by deforming portions of the end extremity of the plug to crimp same around the edge of said cap; said cap having a gudgeon pin attached thereto and located concentrically thereof; and means holding said cap against movement lengthwise of said plug away from said crimping.

11. The terminal structure of claim 10, including in addition stop fingers integral with the side wall of said plug body and extending outwardly therefrom adjacent the outer end of said plug body for preventing the body from being forced completely inside the roller tube; said stop fingers being tabs sheared from the tubular walls of the plug.

12. The terminal structure of claim 10, wherein said cap includes lug means extending radially outward therefrom beyond said plug diameter and generally coextensive with the outer diameter of said tubular roller; said lug means abutting the portions of the end of said plug it extends beyond to form the said means holding the cap against movement lengthwise of said plug away from said crimping.

13. An adjustable roller construction for window shades, comprising: a shade roller having an open tubular end; a cylindrical plug body arranged to be insertable in said tubular roller end and to frictionally engage the inner walls thereof; said plug having a shoulder at the end thereof opposite the end inserted into said tubular roller; said shoulder being wider than the diameter of said plug body and preventing the body from being forced completely inside the roller tube; and at least one annular spacing sleeve slidably seated about said plug body between said shoulder and the end of said roller tube to provide a rigid spacer therebetween for limiting the amount of insertion of said plug in the roller.

14. The adjustable roller construction of claim 13, wherein a plurality of said spacing sleeves are seated over said plug body, each such sleeve having a predetermined incremented length, whereby the depth of insertion of said plug into said roller may be incrementally increased by removal of a selected number of said sleeves.

References Cited by the Examiner

UNITED STATES PATENTS

| | | | |
|---|---|---|---|
| 1,078,466 | 11/1913 | Rose | 160—325 X |
| 1,175,345 | 3/1916 | Cunningham | 160—263 |
| 1,882,592 | 10/1932 | Hendrickson | 160—326 |
| 2,307,095 | 1/1943 | Zaferakis | 160—263 |
| 3,195,618 | 7/1965 | Anderson et al. | 160—323 |

HARRISON R. MOSELEY, *Primary Examiner.*

P. M. CAUN, *Assistant Examiner.*